J. FRANKLIN.
SUCTION GAS GENERATOR.
APPLICATION FILED JUNE 12, 1919.

1,382,074.

Patented June 21, 1921.

Inventor
Joseph Franklin,
By H. R. Kerslake
Atty.

UNITED STATES PATENT OFFICE.

JOSEPH FRANKLIN, OF SMITHTOWN, NEW SOUTH WALES, AUSTRALIA, ASSIGNOR TO THE EFFICIENT GAS POWER COMPANY, LIMITED, OF SYDNEY, NEW SOUTH WALES, AUSTRALIA.

SUCTION GAS-GENERATOR.

1,382,074.  Specification of Letters Patent.  Patented June 21, 1921.

Application filed June 12, 1919. Serial No. 303,676.

*To all whom it may concern:*

Be it known that I, JOSEPH FRANKLIN, a subject of the King of Great Britain and Ireland, residing at Smithtown, Macleay River, State of New South Wales, Commonwealth of Australia, have invented new and useful Improvements in and Relating to Suction Gas-Generators, of which the following is a specification.

This invention relates to suction gas generators of that type in which the heat from the combustion chamber is utilized for the purpose of producing and superheating the steam which is required to be blown through the bed of fuel in the furnace for the production of water gas or semi-water gas, the steam generating and superheating means being affixed to or surrounding the combustion chamber.

My gas producer has been designed with the object of providing a producer which is cheaply constructed and which permits of the generation of gas therein of high calorific value by the combustion of coke or charcoal or like fuel. The producer is provided with means for supplying the necessary air for the ignition of the bed of fuel, and when the same is burning well to supply a mixture of superheated steam and air to the fuel for the generation of semi-water gas, or for supplying superheated steam only if water gas is required. Means are also provided for controlling the flow of water to the steam generating device by the suction of the engine, for causing the intermingling of the air with the steam before its entry to the bed of fuel, for cooling and washing the gas before it is admitted to the engine or motor, and for disconnecting the water supply when it is intended that the producer should be utilized for the production of producer gas instead of water gas or semi-water gas.

The parts of my producer are simply constructed and occupy a minimum space when erected and connected together. The generator may be made readily adaptable for the production of producer gas, water gas or semi-water gas, although it has been designed mainly for the production of semi-water gas. When it is desired to operate the generator for the production of producer gas only, it is only necessary to disconnect the water supply means and to open an air duct leading to the grate of the furnace, so that air may be supplied to the bed of fuel therein.

Figure 1:
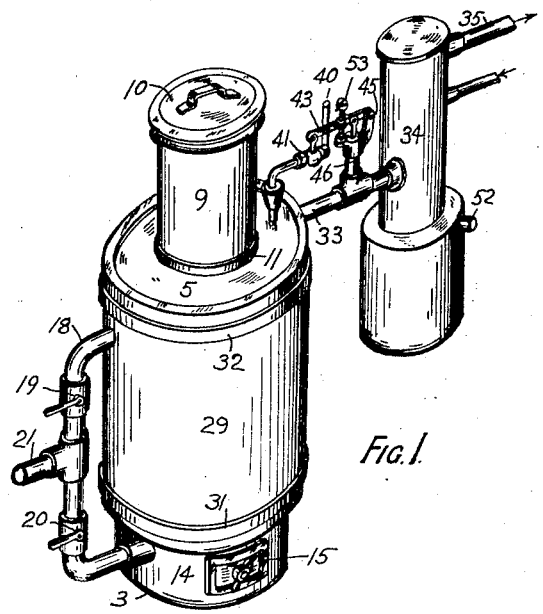
Figure 2:
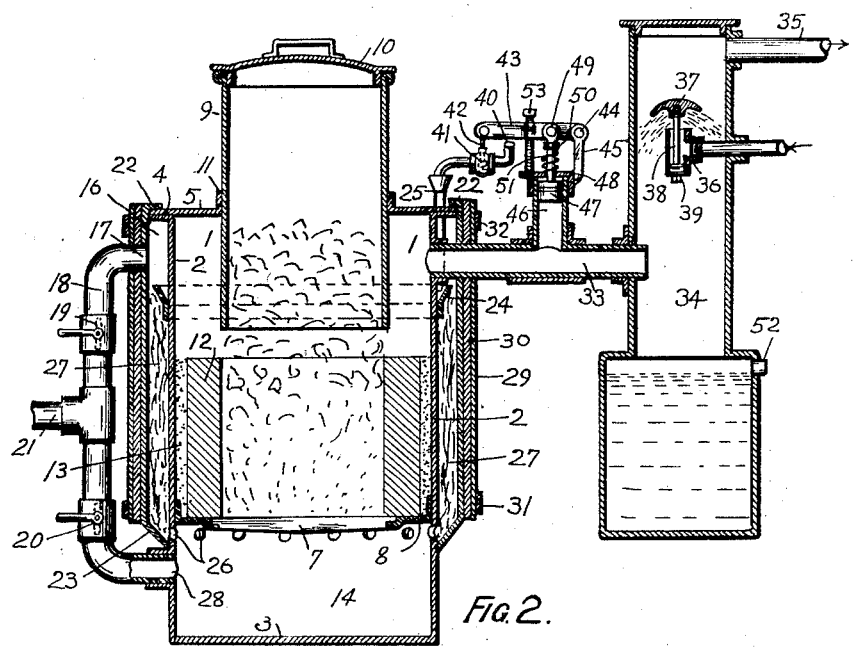

The invention is illustrated in the accompanying drawings in which Figure 1 is a perspective view showing the generator, the air connections thereto, water supply means, and cooler and washer connected to the generator, and Fig. 2 is a vertical sectional elevation of the apparatus shown in Fig. 1.

The generator 1 is preferably circular in cross section and is provided with walls 2 and a closed bottom 3, while its top is formed with a flange 4 upon which rests the cover 5. The cover 5 may be riveted or otherwise secured to the flange 4. The grate bars 7 of the furnace are carried on brackets 8 which are securely affixed to the side walls of the generator 1. Extending through the cover of the generator is a fuel feeding hopper or dome 9 which is furnished with a lid 10. This hopper is held in the cover 5 by means of flanges 11 thereon to which the hopper is secured; its lower end extends downwardly in the generator 1 to a distance a little above the top of the firebrick lining 12 which rests on the grate brackets 8 so that there will be a space between the lining and the lower end of the hopper leading to a gas collecting chamber formed between the walls of the hopper 9 and the generator 1. Surrounding the lining 12 and intermediate its walls and the walls 2 of the generator 1 I prefer to insert a lining 13 of asbestos or like heat insulating material. 14 is the ashpit which is formed by the lower end of the walls and bottom of the generator 1, and is furnished with a door 15.

Surrounding the generator 1 is an annular chamber 16 which is ported at 17 and connected therethrough to an air trunk 18 in which are the dampers 19 and 20. This air trunk is in communication with a fan or other blower at 21, by means of which air is supplied to the generator 1 for blowing-up the bed of fuel when the fire is lighted in the generator. The fan is not required for blowing air to the generator after the fuel has become fully ignited as the air required for the production of gas in the generator is drawn thereinto by the suction of the engine after the latter has been brought into operation. The chamber 16 is closed at top and bottom and its upper walls are flanged at 22 and secured to the cover 5, while its bottom is inturned at 23 and fastened to the walls 2 of the generator. Affixed also to the walls 2 at a point about which the lower end of the hopper 9 terminates in the generator is a shallow trough or gutter 24 which is adapted to receive a limited supply of water from the pipe 25. When water is admitted to the gutter 24 it is heated by the heat from the furnace of the generator 1 and converted to steam which is collected in the annular space 16 where it is intermixed with air drawn into said annular space through the port 17 and carried under the grate bars 7 through the openings 26 in the walls 2 of the generator and thence into the bed of fuel in the furnace when the engine is under load. To assure complete intermixture of the steam and air the annular space 16 is packed with several layers of wire netting 27 which occupy the whole of the annular chamber 16 below the trough 24. The wire is wound around the walls 2 of the generator in layers until the space occupied by it in the annular chamber is filled. During the passage of the air through the wire netting it becomes intermingled with the steam also passing therethrough, the steam being superheated on its passage to the grate bars, as it is caused to travel through the hottest zone of the annular chamber 16 which immediately surrounds the firebrick lining of the generator 1.

To enable the apparatus to be used for the production of water gas, semi-water gas or producer gas the dampers 19 and 20 are provided in the air trunk 18. When it is desired to operate the apparatus for the production of producer gas only the water supply to the trough 24 is disconnected, and the damper 19 is closed and the damper 20 opened, so that air only will be admitted through the trunk 18 to the bed of fuel in the furnace of the generator 1. For the purpose of blowing-up the fire the water service to the generator is also disconnected, the damper 19 is closed, the damper 20 is opened and the lid 10 of the hopper 9 is removed. Air is then blown through the trunk 18 into the bed of fuel until it is sufficiently ignited. When the fan is disconnected, the damper 20 being closed and the damper 19 opened, the lid 10 closed on the hopper 9 and the water supply being connected, a mixture of air and superheated steam will be drawn through the bed of fuel by the suction of the engine. A port 28 is provided in the ashpit 14 through which the air trunk 18 communicates with the bed of fuel in the generator 1.

29 is a jacket surrounding the annular chamber 16. This jacket incloses another jacket or cover 30 of asbestos or other heat insulating material which is in direct contact with the walls of the annular chamber 16. Tie bands of metal 31 and 32 serve to secure the jackets 29 and 30 to the annular chamber 16 as well as to hold the annular chamber in position on the walls of the generator 1.

Gas from the generator passes through the pipe 33 into the cooler and washer 34 as indicated by the arrows and it then passes up through the washer and is entrained to the engine through the pipe 35. The cooler and washer comprises a chamber to which water is admitted above the gas admission vent therein so that the gas in its passage to the engine will have a direction of flow contrary to the flow of water in the washer, and dirt and dust carried by the gas will be separated therefrom and deposited in the lower part of the washer. The water which is admitted to the washer is conveyed to a sprayer having a cup 36 which is furnished with a mushroom head distributer 37 and a spindle 38 which is secured to the body of the sprayer by a nut 39 or other suitable fastening. A body of water entering the cup 36 is ejected against the mushroom head 37 thereof and is distributed in the form of fine spray onto the gas, cooling it and cleansing it of any dirt or particles of fuel which have been entrained with it from the generator 1. 52 is an overflow vent from the bottom of the washer 34 through which water may overflow from the washer after it has been brought into contact with the ascending current of gas on its passage to the engine. A mud door may also be provided in the washer for the purpose of cleaning it of any accumulation of mud which has settled in it.

The means for supplying water to the generator is automatically controlled by the operation of the engine. It is fitted to the gas outlet pipe 33, and comprises a water supply pipe 40 in which is a valve 41 whose spindle 42 is attached to the lever 43 pivoted at 44 to the bracket 45 which is affixed to the cylinder 46 mounted on the pipe 33. The piston 47 is movable in the cylinder 46 and it carries a piston rod 48 which is secured at 49 to the lever 43. The cylinder 47 is closed at its top but is open at its bottom to the pipe 33. Mounted on the piston rod 48 is a collar 50 against which one end of the spring 51 bears while the other end of the spring abuts against the closed top end of the cylinder 46. The spring is tensioned to keep the piston 47 in such position in the cylinder 46 that the valve 41 will only be opened to admit water therethrough to the generator depending on the suction of the engine. When the engine is running the piston 47 is drawn down in the cylinder 46 and the valve 41 is opened to correspond with the movement of the piston but depending on the degree of suction on the piston 47 caused by the movements of the engine piston. To further regulate the movements of the piston 47 and the consequent opening of the valve 41 the check pin or screw 53 is fitted to the lever 43. The lower end of the check pin abuts against the closed end of the cylinder 46 and the downward movement of the piston 47 in the cylinder can be regulated by adjusting the distance of the lever 43 in relation to the top end of the cylinder 46. The plug of the valve 41 is held against its seating when the piston 47 is positioned in the upper part of the cylinder 46, but when the piston is depressed in the cylinder by the suction of the engine, the valve plug is removed from its seating and water is then free to pass to the pipe 25 and from thence to the trough 24 in the annular chamber 16. In addition to the water supply means described, the pipe 40 may also be fitted with a main supply cock (not shown) through which entry of water to the valve 41 may be prohibited by shutting off the main cock when water is not to be supplied to the generator.

Though I have described my invention in connection with the generation of gas through the operation of an engine or motor to which the generator may be connected, it will be readily understood that my generator can be used with a fan or other exhausting apparatus for causing a draft of steam and air or air only in the generator for the purpose of producing gas which is to be stored in a bell or other receiver to be withdrawn therefrom for use either for heating or for power purposes.

In operation, when it is desired to generate semi-water gas, a sufficiency of fuel is fed through the hopper 9 onto the grate bars 7, and lighted. The damper 20 is opened, the damper 19 is shut, the lid 10 removed from the hopper 9, and the water supply means being disconnected, air is blown through the trunk 18 into the bed of fuel until it is sufficiently ignited. The damper 20 is then closed, the blower is disconnected, the water supply means connected to the generator, and the lid 10 secured to the hopper 9, the engine having been set in operation causes a supply of air to be drawn into the annular space 16 wherein it intermingles with the steam which has been generated therein from the water admitted to the trough 24. The suction of the engine continuing the mixed air and steam is drawn through the wire netting 27, and thence through the openings 26 in the generator walls and up into the bed of fuel in the furnace. The gas generated passes from the generator through the pipe 33 into the cooler and washer from whence it is conveyed to the engine or motor through the pipe 35. During the passage of the intermingled steam and air through the lower part of the annular chamber 16 the steam is superheated.

What I claim as my invention and desire to secure by Letters Patent is:—

A suction gas generator comprising a gas generating chamber having a cover, a steam generating and superheating chamber surrounding the gas generating chamber, a furnace in the lower portion of the gas generating chamber including brackets secured to the lower walls of the said chamber and firebars supported on said brackets, a lining of firebrick for said furnace carried on said brackets, a fuel feeding hopper provided with a lid extending through the cover of said gas generating chamber and disposed above said firebrick lining, an ash pit below said fire-bars having a plurality of openings therein communicating with said steam generating chamber, a gas outlet pipe leading from the gas generating chamber and extending through the walls of said steam generating chamber, a water receiving trough mounted on the walls of the gas generating chamber, a plurality of layers of wire netting disposed within said steam generating chamber and around the wall of said gas generating chamber below said trough, and means for feeding air and water to said steam generating chamber.

In testimony whereof I have signed my name to this specification.

JOSEPH FRANKLIN.